Dec. 19, 1967  J. P. BRODERICK  3,358,734
WELDING TORCH
Filed Aug. 8, 1966  3 Sheets-Sheet 1
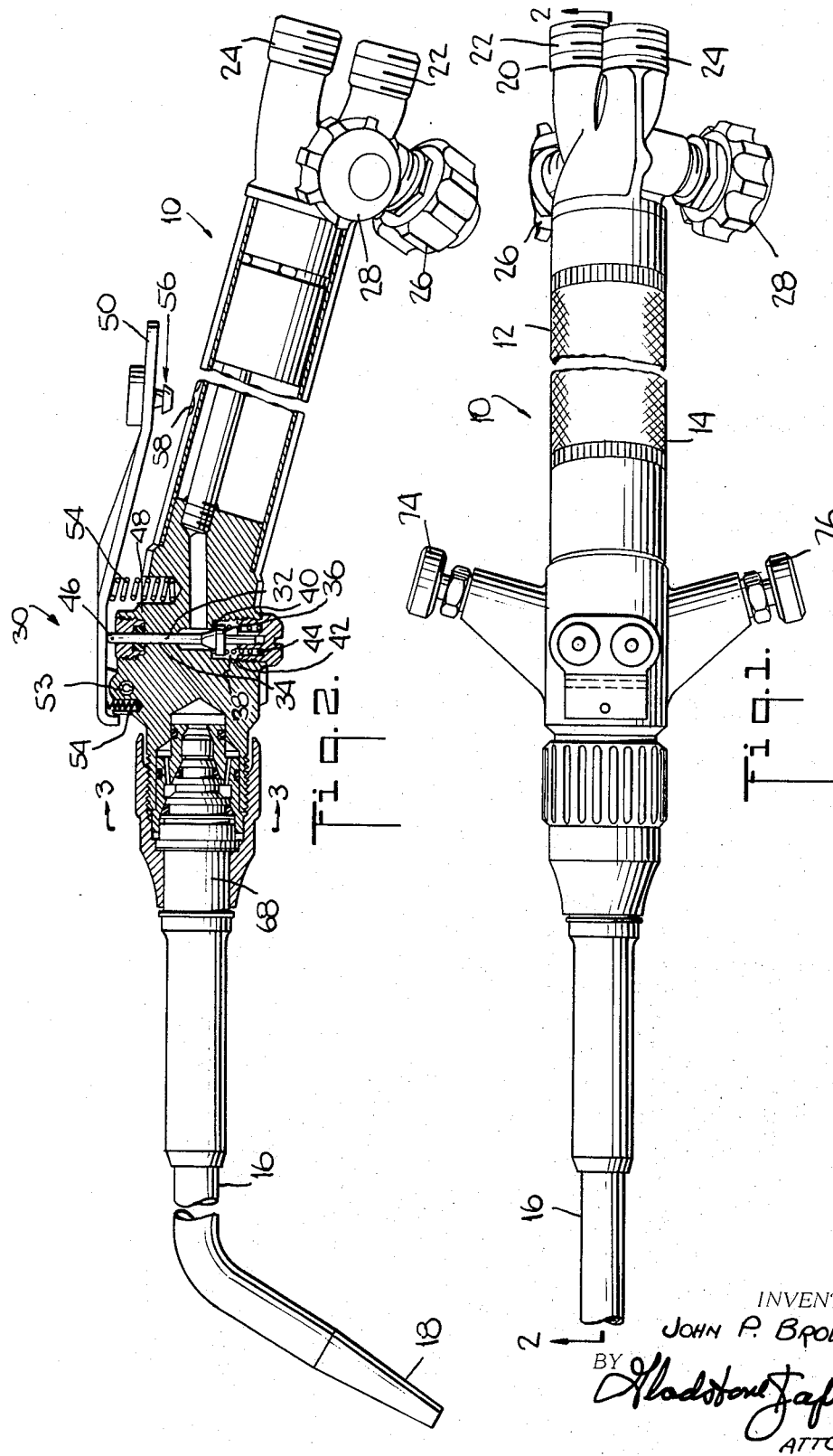
INVENTOR.
JOHN P. BRODERICK
BY
ATTORNEY Dec. 19, 1967   J. P. BRODERICK   3,358,734
WELDING TORCH Filed Aug. 8, 1966   3 Sheets-Sheet 2

INVENTOR.
JOHN P. BRODERICK
BY
ATTORNEY

Dec. 19, 1967  J. P. BRODERICK  3,358,734
WELDING TORCH

Filed Aug. 8, 1966  3 Sheets-Sheet 3

INVENTOR.
JOHN P. BRODERICK
BY
ATTORNEY

United States Patent Office 3,358,734
Patented Dec. 19, 1967

3,358,734
WELDING TORCH
John P. Broderick, Bayside, N.Y., assignor to Eutectic Welding Alloys Corporation, Flushing, N.Y., a corporation of New York
Filed Aug. 8, 1966, Ser. No. 571,002
7 Claims. (Cl. 158—27.4)

ABSTRACT OF THE DISCLOSURE

Welding torch having semi-automatic valve means for instantly switching from one working flame to another working flame.

This invention relates generally to welding torches and more particularly to an improved welding torch with instantaneous flame switching capability.

Heretofore it has been known that in the art of welding and in the use of welding torches, generally more than one type of welding flame is required such as a preheat flame and a working flame. The preheat flame comprises a wide coned flame which is generally utilized for preparation or preheat of the object to be welded and the working flame is a narrow flame that is actually utilized to perform the working operation. Additionally in various welding operations such as for example in the welding of cast iron, various other torch flames such as carborizing and oxidizing type flames are required. The type of flame generated through the working end of the welding torch is determined by the quantities of fuel gas and oxygen that is fed into the torch and as is understood by those skilled in the art such quantities are controlled by standard type control valves, one for oxygen and the other for fuel gas, provided on the welding torch. However, since each torch has only one set of valves, each time a welding flame is desired, work must stop and the valve settings must be adjusted for the desired flame. This of course is time-consuming and additionally breaks the rhythm of the work and extends labor costs. Presently no welding torch is known in the industry which has the capability of permitting instantaneous switching from one to any two types of predetermined flames to another.

It is the general object of the present invention to overcome the foregoing and other piror art practices by the provision of a more versatile welding torch.

Another object of this invention is to provide the welding torch capable of permitting instantaneous switching from one type welding flame to another.

A further object of the present invention is to provide a welding torch that will substantially permit the welder to carry through his job without stopping to reset the welding torch flame.

The aforementioned objects of the present invention and other objects which will become apparent as the description proceeds are accomplished by providing a welding torch with a housing, which welding torch has actuating means in the housing and means operatively associated with and actuated by the actuating means for modifying the flame of the welding torch.

For a better understanding of the present invention reference should be had to the accompanying drawings wherein like numerals of reference indicate similar parts and wherein;

FIGURE 1 is a perspective view illustrating the welding torch of the present invention;

FIGURE 2 is an elevational cross-sectional view taken along line 2—2 of FIGURE 1 in the direction of the arrows;

Figure 3:
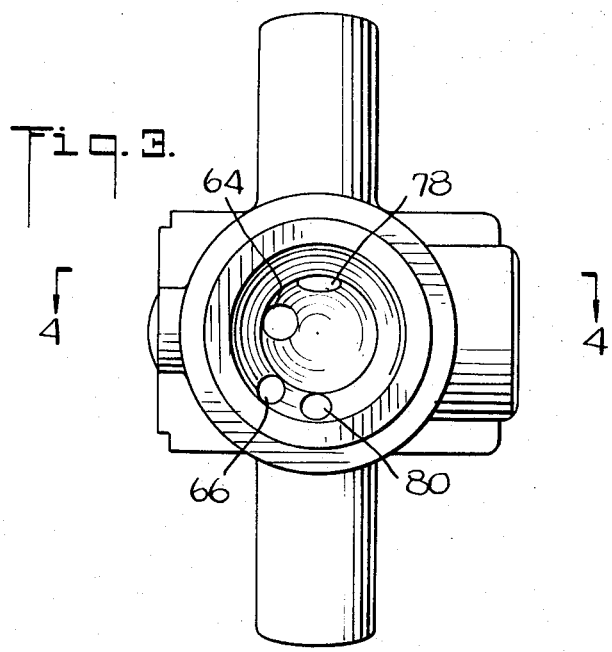
FIGURE 3 is a detailed front sectional view taken along the line 3—3 of FIGURE 2 in the direction of the arrows.

With specific reference to the form of the present invention illustrated in the drawings and referring particularly to FIGURE 1, a welding torch is indicated generally by the reference numeral 10. The welding torch 10 has a casing 12 which comprises a main portion referred to as the torch body 14 and a front or working portion 16 which incorporates a welding tip 18 which is generally removable and the tip 18 and torch body 14 are provided with thread means for this purpose as is shown in the cross-sectional FIGURE 2. The rear end 20 of the torch body 14 is provided with conduits 22 and 24 with threaded ends that are constructed and arranged to connect to hoses that are in turn respectively connected to an external pressurized fuel gas supply such as acetylene and a pressurized supply of combustion supporting gas such as oxygen.

In order to control the amount of oxygen and acetylene that is permitted to flow in the welding torch 10, a valve means such as standard needle valves 26 and 28 are provided on the oxygen and acetylene conduits respectively. Referring to FIGURE 2, it will be noted that the oxygen and acetylene conduits are extended within the casing 12 and maintain the oxygen and acetylene separated throughout the torch body and through flame switching means such as an automatic flame switching assembly 30 as shown in FIGURE 2.

Flame switching assembly

The central portion of the torch body as is shown in FIGURES 2, 3, 4, 5 and 6 is provided with means for automatically switching the volume of oxygen and acetylene flowing within the torch 10, from that which is determined by the setting of the valves 26 and 28 to an entirely different but pre-determined volume flow. The valve switching assembly 30 shown in FIGURE 2 comprises two identical assemblies one for oxygen flow and the other for acetylene flow and for the sake of clarity only, one of the assemblies is illustrated in FIGURE 2. Each of the valve switching assemblies 30 comprise a plunger 32 that is constructed and positioned within an internal opening 34 in the torch body 14 to permit the plunger 32 controlled vertical reciprocal motion within the torch body 14. Upper stop 40 and lower stop 42 provided in a plunger head cavity 38 in the torch body determine the upper and lower limits of the travel in the plunger head cavity 38 of a plunger head 36 provided in the lowermost end of the plunger 32. Biasing means such as a spring 44 disposed in the plunger head cavity 38 and arranged between the plunger head 36 and the bottom wall of the torch body 14 as shown in FIGURE 2 are utilized to normally urge the plunger head against the upper stop 40 in the position of the flame switching assembly 30 shown in FIGURE 2. The plunger 32 at its uppermost end 46 extends slightly above the torch body and at its upper portion is provided with seal means such as ring seals 48 to maintain a gas tight condition at all times between the plunger 36 and the plunger head cavity 38.

Activating means such as a lever 50 is rotatably attached, such as by a swivel pin 53, on the torch body 14 as shown in FIGURE 2, and arranged to contact the upper tip 52 of the plunger 32 so that as the lever 50 is depressed in the direction of the torch body, the lever 50 will exert a downward pressure on the plunger 32 to cause the plunger head 36 to move in a vertical downward direction away from the stop 40 and travel toward the stop 42. Biasing means such as springs 54 are provided on the torch body and are arranged between the torch body 14 and the lever 50, so that as the lever 50 is pressed downward the springs 54 are compressed and serve to return the lever 50 to its initial position when the pressure from the lever 50 is removed. In order to maintain for an extended period of time the lever 50 in its downwardmost position closest to the torch body 14 to have the plunger head 36 also at its downwardmost position close to the stop 42, a locking means, such as a standard swivel lock assembly 56 is provided on the lever 50 with a retainer opening 58 on the torch body 14. It will thus be understood that when the lever 50 is in its depressed position, the swivel lock assembly 56 is keyed to the retainer hole 58 and serves to hold the lever in that position until it is positively released therefrom.

Figure 4:
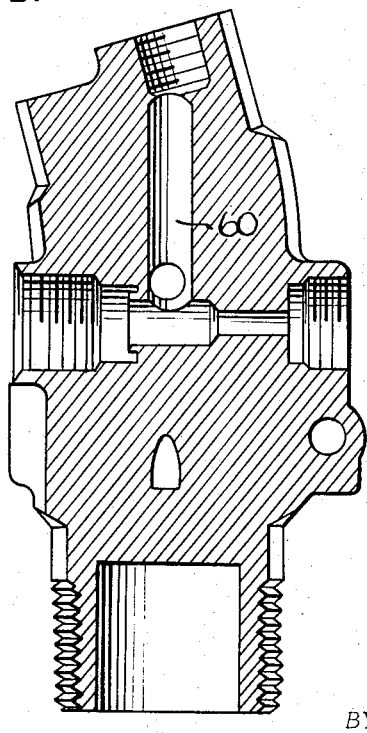
FIGURE 4 is a vertical sectional view taken along the line 4—4 of FIGURE 3 in the direction of the arrows.
Figure 5:
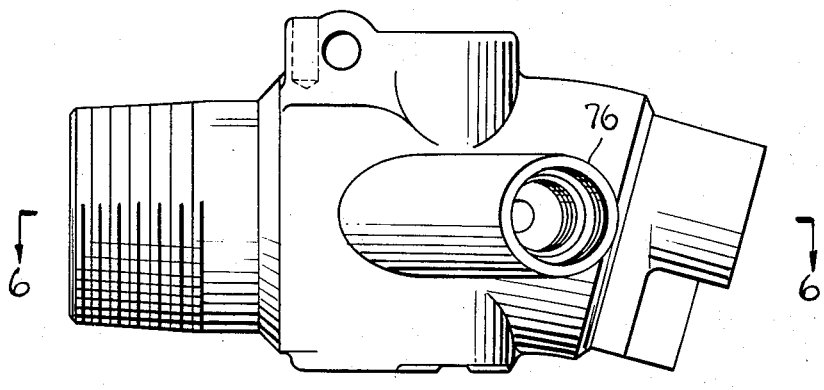
FIGURE 5 is an enlarged side view of a portion of the casing detailed in FIGURE 3.
Figure 6:
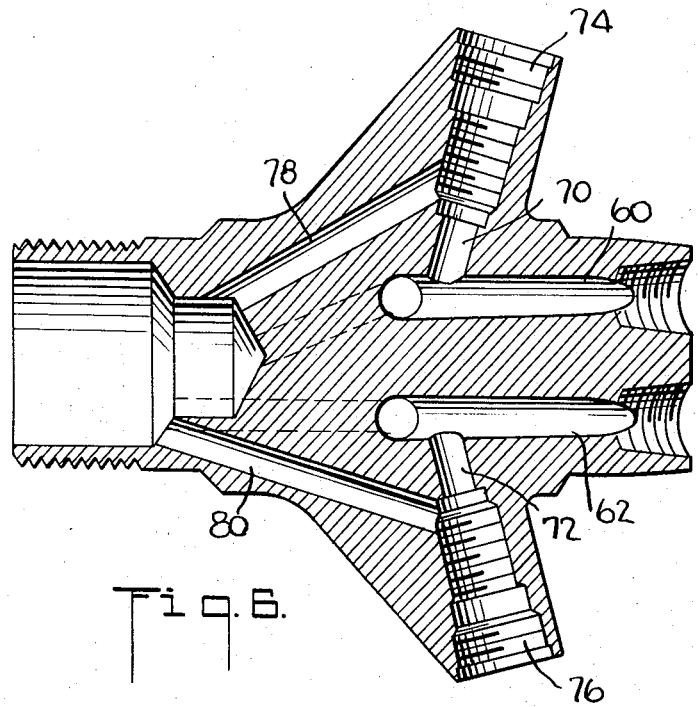
FIGURE 6 is a horizontal sectional view taken along the line 6—6 of FIGURE 5 in the direction of the arrows.

As shown in FIGURES 2, 3, 4 and 5, the conduits 22 and 24 extend into the torch body 14 and terminate in respective terminal conduits 60 and 62 and as the lever is fully depressed positioning the plunger 46 in its bottommost position in the plunger head cavity 38, the flowing oxygen and acetylene gases will maintain through flow through the torch body and will be discharged through respective orifices 64 and 66 as shown in FIGURE 3, to the gas mixing area 68 of the torch where the oxygen and acetylene will mix and the mixture will be discharged through the torch tip 18, which gas discharge mixture when ignited will produce the type of flame that is regulated by the setting of the needle valves 26 and 28. When a different type of flame is desired, the swivel lock assembly 56 is switched to permit the springs 44 and 54 to push the lever up and to set the plunger head 36 against the stop 40. As shown in FIGURES 2, 4 and 6, when the plunger head 36 is against the stop 40, it will shut gas flow through the respective plunger head cavities 38 and the oxygen and acetylene gases in their respective conduits will be forced to flow into each respective bypass conduit 70 and 72 as shown in FIGURE 6. Conduits 70 and 72 are provided with valving means such as needle valves 74 and 76 respectively, which as is understood will be arranged and set to provide for an oxygen and acetylene volume flow to produce the second type of flame desired from the welding torch. The flowing oxygen and acetylene gases are thus passed through the valves 74 and 76 and are discharged through respective valve discharge conduits 78 and 80 into the gas mixing chamber 68 where the respective gases mix and are discharged through the torch tip 18. It will be further understood that when the flame is switched from one type of flame to another, the gases discharged from the torch tip will not have to be reignited and the flame through the tip will be a continuous flame but will have the modified characteristics as controlled by valve settings of the needle valves 74 and 76.

It will be understood by those skilled in the art that the objects of the present invention will be achieved by providing a welding torch capable of instantaneous switching from one type of flame to another without operator time delay or interruption of service.

While in accordance with the patent statutes a preferred embodiment of the present invention has been described and illustrated in detail, it is to be particularly understood that the invention is not limited thereto or thereby.

We claim:

1. A welding torch comprising a main body portion, a tip section disposed in front of said main body portion, separate passageways in said main body portion for separately conducting a pressurized combustible gas and a combustion supporting gas through said main body portion, first valve means for independently adjusting the gas flow in each of said passageways conducting said pressurized combustible gas and said combustion supporting gas, a mixing area in said main body portion of said torch for mixing said two gases and communicating with said tip section for directing the exit of said gases therefrom, dual by-pass passageways extending rearwardly from said mixing area and communicating with said separate passageways upstream from a flame switching assembly, second valve means for independently adjusting the gas flow in each of said by-pass passageways; said flame switching assembly comprising a pair of cavities in said main body portion of said torch, said cavities interrupting the continuity of said separate passageways, instantaneously acting valve means disposed in each of said cavities permitting the flow of gases to be controlled by one of said first and second valve means, actuating means secured to said main body portion of said torch and communicating with said instantaneously acting valve means for instantaneously switching from one working flame controlled by one of said valve means and having a predetermined ratio of combustion supporting gas to combustible gas to another working flame controlled by the other of said valve means and having another predetermined ratio of combustion supporting gas to combustible gas.

2. The welding torch of claim 1 wherein said actuating means comprises a lever and biasing means for controlling the position of said lever.

3. The welding torch of claim 2 wherein said torch is provided with means for locking said lever to said main body portion.

4. The welding torch of claim 2 wherein said first and second valve means are capable of varying the ratio of said gases and wherein the volume of said gases passing through said second valve means is no greater than the volume of gases passing through said first valve means.

5. The welding torch of claim 3 wherein said instantaneously acting valve means each comprises a plunger having a valve seat and guides for controlling the motion of said plunger, and upper and lower limit stops which restrict the travel of said plunger within said cavity to an open and closed position.

6. The welding torch of claim 5 wherein biasing means disposed in said cavity between the head of said plunger and the bottom wall of said cavity normally urges the head of said plunger against the upper limit stop of said instantaneously acting valve means.

7. A welding torch comprising a main body portion, a tip section disposed in front of said main body portion, longitudinally disposed passageways in said main body portion for separately conducting a pressurized combustible gas and a combustion supporting gas through said main body portion, a first pair of valves for independently adjusting the gas flow in each of said passageways conducting said pressurized combustible gas and said combustion supporting gas, a mixing area in said main body portion of said torch for mixing said two gases and communicating with the tip section for directing the exit of said gases therefrom, dual by-pass passageways extending rearwardly from said mixing area and communicating with said longitudinally disposed passageways upstream from a flame switching assembly, a second pair of valves for independently adjusting the gas flow in each of said by-pass passageways; said flame switching assembly comprising a pair of parallel cavities in said main body portion of said torch, said cavities being substantially vertically disposed and interrupting the continuity of said longitudinally disposed passageways, instantaneously acting valve means disposed in each of said parallel cavities and being biased so as to normally permit the flow of gases to be controlled by said second pair of valves, an actuating lever pivotably secured to said main body portion of said torch and communicating with said instantaneously acting valve means for instantaneously switching from a first working flame controlled by said first pair of valves and having a predetermined ratio of combustion supporting gas to combustible gas to a second working flame controlled by said second pair of valves and having another predetermined ratio of combustion supporting gas to combustible gas.

References Cited

UNITED STATES PATENTS

| | | | |
|---|---|---|---|
| 1,810,158 | 6/1931 | Campbell | 158—27.4 |
| 1,835,845 | 12/1931 | Campbell | 158—27.4 |
| 1,865,905 | 7/1932 | Hammon | 158—27.4 |

JAMES W. WESTHAVER, *Primary Examiner.*
FREDERICK L. MATTESON, JR., *Examiner.*
E. G. FAVORS, *Assistant Examiner.*